US012349238B2

(12) United States Patent
Alarcon et al.

(10) Patent No.: US 12,349,238 B2
(45) **Date of Patent: *Jul. 1, 2025**

(54) METHOD, SYSTEM AND DEVICE FOR CONTROLLING A HEATING ELEMENT

(71) Applicant: Fontem Ventures B.V., Amsterdam (NL)

(72) Inventors: Ramon Alarcon, Los Gatos, CA (US); Michael Starman, Los Gatos, CA (US)

(73) Assignee: Fontem Ventures B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/399,642

(22) Filed: Dec. 28, 2023

(65) Prior Publication Data

US 2024/0215114 A1 Jun. 27, 2024

Related U.S. Application Data

(60) Continuation of application No. 16/268,963, filed on Feb. 6, 2019, now Pat. No. 11,864,279, which is a division of application No. 14/834,238, filed on Aug. 24, 2015, now Pat. No. 10,201,186.

(60) Provisional application No. 62/040,944, filed on Aug. 22, 2014.

(51) Int. Cl.

| | |
|---|---|
| ***H05B 1/02*** | (2006.01) |
| ***A24F 40/10*** | (2020.01) |
| ***A24F 40/50*** | (2020.01) |

(52) U.S. Cl.

CPC ........... *H05B 1/0227* (2013.01); *A24F 40/50* (2020.01); *H05B 1/0252* (2013.01); *A24F 40/10* (2020.01)

(58) Field of Classification Search

CPC ........ A24F 40/10; A24F 40/50; A24F 47/008; A24F 40/05; H05B 1/0227; H05B 1/0252

USPC .................. 219/492, 494, 497; 392/386–406

See application file for complete search history.

(56) References Cited

U.S. PATENT DOCUMENTS 3,710,778 A * 1/1973 Cornelius ............ A61B 5/1473 257/253
5,457,620 A * 10/1995 Dromgoole ............ G01R 31/40 363/20
10,201,186 B2 * 2/2019 Alarcon ............... H05B 1/0252
2005/0280408 A1 * 12/2005 Wobschall ............. G01D 3/022 369/30.36
2014/0014126 A1 * 1/2014 Peleg ...................... A24F 40/10 374/54
2014/0254055 A1 * 9/2014 Xiang ...................... H02H 7/20 361/86

* cited by examiner

*Primary Examiner* — Sang Y Paik
(74) *Attorney, Agent, or Firm* — Dykema Gossett PLLC

(57) ABSTRACT

A system, a method, and a device for controlling a heating element in electronic articles, and more particularly for controlling a heating element in electronic cigarettes. In one embodiment A system for controlling a heater can comprise a power source, a memory configured to store programing, an MCU, a solution, a heater configured to heat the solution, and a sensor. The power source, the memory, the MCU, the heater, and the sensor can be electrically coupled. The MCU can receive signals from the sensor and control the heater, and the MCU can be configured to use programming stored in the memory to control the heater.

20 Claims, 13 Drawing Sheets

Resistance change measurement (without current sense resistor)

Resistance change measurement (without current sense resistor)

Resistance change measurement (with current sense resistor)

Resistance change measurement (with current sense resistor)

Heater PWM Compensation for battery voltage

Heater PWM Compensation for battery AND heater parameters

METHOD, SYSTEM AND DEVICE FOR CONTROLLING A HEATING ELEMENT

CROSS-REFERENCE TO RELATED APPLICATIONS

This application is a continuation of U.S. application Ser. No. 16/268,963, filed 6 Feb. 2019 (the '963 application), now U.S. Pat. No. 11,864,279, issued 2 Jan. 2024, which is a division of U.S. application Ser. No. 14/834,238, filed 24 Aug. 2015 (the '238 application), now U.S. Pat. No. 10,201,186, issued 12 Feb. 2019, which claims the benefit of U.S. provisional application No. 62/040,944, filed 22 Aug. 2014 (the '944 application). The '963 application, the'238 application, and the '944 application are all hereby incorporated by reference in their entirety as though fully set forth herein.

FIELD OF THE DISCLOSURE

The present disclosure relates to a system, a method, and a device for detecting and controlling the heating elements of electronic articles, and more particularly for controlling the heating of elements in an electronic cigarette.

BACKGROUND OF THE DISCLOSURE

Electronic cigarettes, also known as e-cigarette (eCigs) and personal vaporizers (PVs), are electronic inhalers that vaporize or atomize a liquid solution into an aerosol mist that may then be delivered to a user. A typical rechargeable eCig has two main parts—a housing holding a battery and a cartomizer. The housing holding the battery typically includes a rechargeable lithium-ion (Li-ion) battery, a light emitting diode (LED), and a pressure sensor. The cartomizer typically includes a liquid solution, an atomizer and a mouthpiece. The atomizer typically includes a heating coil that vaporizes the liquid solution.

For functional reasons, the rechargeable battery is not directly connected to external contacts. Instead, a diode and a field effect transistor (FET) are connected in series with the battery connection. When a FET is used, the FET is turned on once a charging process is detected for the eCig. The eCig may be charged by placing the eCig in a charging station that is configured to receive the particular eCig. The charging station may include a charging circuit that is configured to supply power to the eCig to charge the battery.

SUMMARY OF THE DISCLOSURE

The present disclosure provides systems, methods, devices, and computer programs for controlling a heating element.

In one embodiment, a system for controlling a heater can comprise a power source, a memory configured to store programing, a microcontroller unit (MCU), a solution, a heater configured to heat the solution, and a first sensor configured to detect a smoking action. The power source, the memory, the MCU, the heater, the first sensor, and the transmitter can be electrically coupled. The MCU can receive signals from the first sensor, control the heater, and communicate with the transmitter. The MCU can also be configured to use programming stored in the memory to control the heater.

In another embodiment, a method for heater compensation in an electronic smoking device can comprise detecting whether a sensor is activated, reading a voltage of a battery if the sensor is activated, reading a memory for at least one heater parameter, determining a pulse width modulation for a heater control from the battery voltage and the at least one heater parameter, driving a heater at the determined pulse width modulation, detecting whether the sensor is activated, and changing to sleep mode when the sensor is no longer activated.

In yet another embodiment, a method for heater compensation in an electronic smoking device can comprise, detecting whether a sensor is activated, turning on a heater, reading a current or temperature signal, determining a pulse width modulation for the heater, and driving the heater at a desired pulse width modulation.

Additional features, advantages, and embodiments of the disclosure may be set forth or apparent from consideration of the detailed description and drawings. Moreover, it is to be understood that the foregoing summary of the disclosure and the following detailed description, drawings, and attachment are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

Figure 1A:
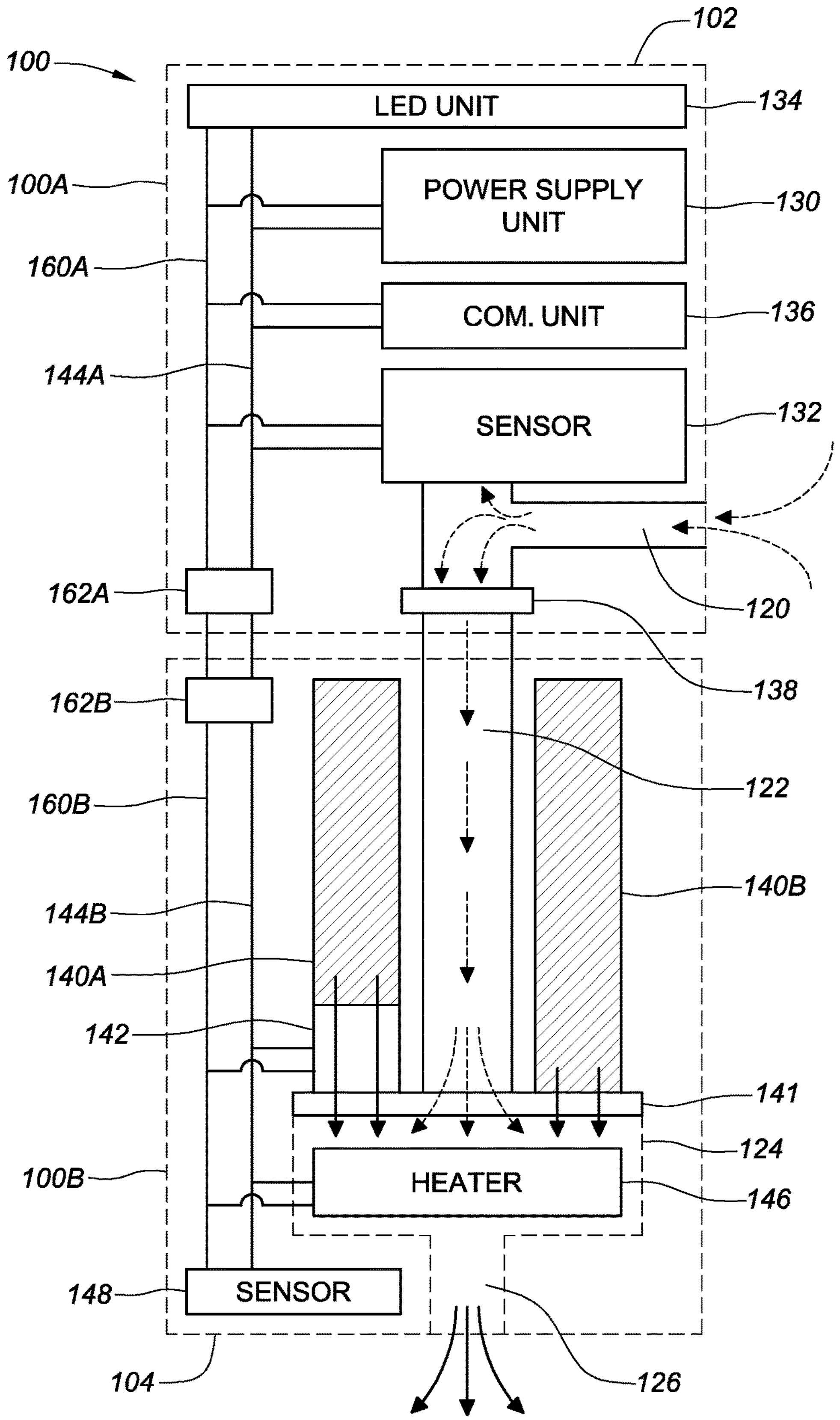
FIG. 1A depicts a structural overview of an electronic smoking device constructed according to the principles of the disclosure.

The disclosure and the various features and advantageous details thereof are explained more fully with reference to the non-limiting embodiments and examples that are described and/or illustrated in the accompanying drawings and detailed in the following. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

Figure 2:
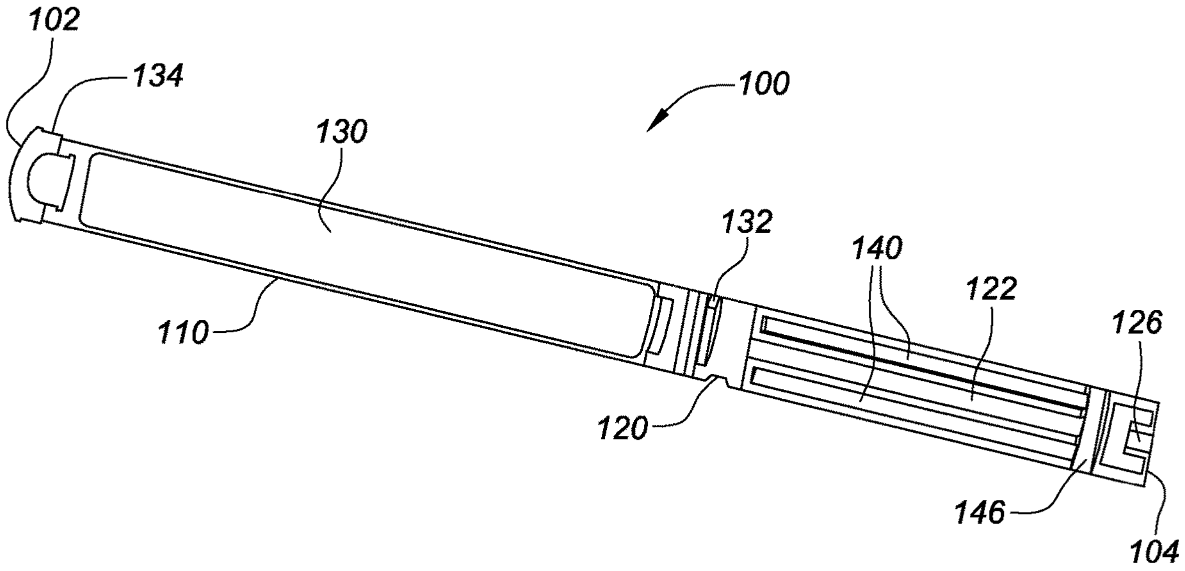
FIG. 2 is a cross-section view of a design of the electronic smoking devices shown in FIGS. 1A and 1B.

FIG. 1A shows a structural overview of an electronic cigarette (eCig) 100 constructed according to the principles of the disclosure. The eCig 100 may be disposable or reusable. The eCig 100 may have a multi-body construction including two or more bodies. For example, the eCig 100 may be a reusable eCig including a first body 100A and a second body 100B and/or the like, that may be easily connected to and disconnected from each other anytime without using any special tools. For example, each body may include threaded parts. Each body may be covered by a different housing. The second body 100B may contain consumable material, such as, e.g., smoking liquid and/or the like. When the consumable material is fully consumed, the second body 100B may be disconnected from the first body 100A and replaced with a new one. Also, the replacement second body 100B may be a different flavor, strength, type and/or the like. Alternatively, the eCig 100 may have a single body construction, as shown in FIG. 2. Regardless of the construction type, the eCig 100 may have an elongated shape with a first end 102 and a second end 104, as shown in FIG. 2, which may be similar to a conventional cigarette shape. Other non-conventional cigarette shapes are also contemplated. For example, the eCig 100 may have a smoking pipe shape or the like.

The eCig 100 may include an air inlet 120, an air flow path 122, a vaporizing chamber 124, a smoke outlet 126, a power supply unit 130, a sensor 132, a container 140, a dispensing control device 141, a heater 146, and/or the like. Further, the eCig 100 may include a controller, such as, e.g., microcontroller, microprocessor, a custom analog circuit, an application-specific integrated circuit (ASIC), a programmable logic device (PLD) (e.g., field programmable gate array (FPGA) and the like) and/or the like and basic digital and analog circuit equivalents thereof, which is explained below in detail with reference to FIG. 1B. The air inlet 120 may extend from, for example, an exterior surface of the housing 110 as shown in FIG. 2. The air flow path 122 may be connected to the air inlet 120 and extending to the vaporizing chamber 124. The smoke outlet 126 may be connected to the vaporizing chamber 124. The smoke outlet 126 may be formed at the second end 104 of the eCig 100 and connected to the vaporizing chamber 124. When a user sucks the second end 104 of the eCig 100, air outside the air inlet 120 may be pulled in and moved to the vaporizing chamber 124 via the air flow path 122, as indicated by the dotted arrows in FIG. 1A. The heater 146 may be a solid state heater shown in FIG. 5 or the like, and located in the vaporizing chamber 124. The container 140 may contain the smoking liquid and connected to the vaporizing chamber 124. The container 140 may have an opening connected to the vaporizing chamber 124. The container 140 may be a single container or a group of containers, such as, e.g., containers 140A, 140B and the like, that are connected to or separated from each other.

The dispensing control device 141 may be connected to the container 140 in order to control flow of the smoking liquid from the container 140 to the vaporizing chamber 124. When the user is not smoking the eCig 100, the dispensing control device 141 may not dispense the smoking liquid from the container 140. The dispensing control device 141 may not need any electric power from, for example, the power supply unit 130 and/or the like, for operation.

The power supply unit 130 may be connected to one or more components that require electric power, such as, e.g., the sensor 132, the heater 146, and the like, via a power bus 160. The power supply unit 130 may include a battery (not shown), such as, e.g., a rechargeable battery, a disposable battery and/or the like. The power unit 130 may further include a power control logic (not shown) for carrying out charging of the battery, detecting the battery charge status, performing power save operations and/or the like. The power supply unit 130 may include a non-contact inductive recharging system such that the eCig 100 may be charged without being physically connected to an external power source. A contact charging system is also contemplated The sensor 132 may be configured to detect the user's action for smoking, such as, e.g., sucking of the second end 104 of the eCig 100, touching of a specific area of the eCig 100 and/or the like. When the user's action for smoking is detected, the sensor 132 may send a signal to other components via a data bus 144. For example, the sensor 132 may send a signal to turn on the heater 146. Also, the sensor 132 may send a signal to the active dispensing device 142 (if utilized) to dispense a predetermined amount of the smoking liquid to the vaporizing chamber 124. When the smoking liquid is dispensed from the container 140 and the heater 146 is turned on, the smoking liquid may be mixed with the air from the air flow path 122 and vaporized by the heat from the heater 146 within the vaporizing chamber 124. The resultant vapor (i.e., smoke) may be pulled out from the vaporizing chamber 144 via the smoke outlet 126 for the user's oral inhalation, as indicated by solid arrows in FIG. 1A. In order to prevent the smoke generated in the vaporizing chamber 144 from flowing towards the air inlet 120, the air flow path 122 may include a backflow prevention screen or filter 138.

When the user's action for smoking is stopped, the sensor 132 may send another signal to turn off the heater 146, the active dispensing device 142, and/or the like, and vaporization and/or dispensing of the smoking liquid may stop immediately. In an alternative embodiment, the sensor 132 may be connected only to the power supply unit 130. When the user's action for smoking is detected, the sensor 132 may send a signal to the power supply unit 130. In response to the signal, the power supply unit 130 may turn on other components, such as, e.g., the heater 146 and the like, to vaporize the smoking liquid.

In an embodiment, the sensor 132 may be an air flow sensor. For example, the sensor 132 may be connected to the air inlet 120, the air flow path 122, and/or the like, as shown in FIG. 1A. When the user sucks the second end 104 of the eCig 100, some of the air pulled in from the air inlet 120 may be moved towards the sensor 132, which may be detected by the sensor 132. Additionally or alternatively, a capacitive sensor 148 may be used to detect the user's touching of a specific area of the housing 100. For example, the capacitive sensor 148 may be formed at the second end 104 of the eCig 100. When the eCig 100 is moved to the user's mouth and the user's lip touches the second end 104, a change in capacitance may be detected by the capacitive sensor 148, and the capacitive sensor 148 may send a signal to activate the heater 146 and the like. Other types of sensors are also contemplated for detecting the user's action for smoking, including, for example, an acoustic sensor, a pressure sensor, a touch sensor, an optical sensor, a Hall Effect sensor, an electromagnetic field sensor, and/or the like. In one embodiment the sensor can comprise a sensor generally shown and described in PCT. Patent Application No. PCT/US204/043253 filed 19 Jun. 2014, the entire disclosure of which is hereby incorporated by reference as though fully set forth herein.

The eCig 100 may further include a communication unit 136 for wired (e.g., Serial Peripheral Interface or the like) and/or wireless communications with other devices, such as, e.g., a pack 200 (not shown) for the eCig 100, a computer 310 (not shown) and/or the like. The communication unit 136 may also connect the eCig 100 to a wired network (e.g., LAN, WAN, Internet, Intranet and/or the like) and/or a wireless network (e.g., a WIFI network, a Bluetooth network, a cellular data network and/or the like). For example, the communication unit 136 may send usage data, system diagnostics data, system error data, and/or the like to the pack, the computer, and/or the like. To establish wireless communication, the communication unit 136 may include an antenna and/or the like. The eCig 100 may include a terminal 162 for wired communication. The terminal 162 may be connected to another terminal, such as, e.g., a cigarette connector of the pack or the like, in order to exchange data. The terminal 140 may also be used to receive power from the pack or other external power source and recharge the battery in the power supply unit 130.

When the eCig 100 has a multi-body construction, the eCig 100 may include two or more terminals 162 to establish power and/or data connection therebetween. For example, in FIG. 1A, the first body 100A may include a first terminal 162A and the second body 100B may include a second terminal 162B. The first terminal 162A may be connected to a first power bus 160A and a first data bus 144A. The second terminal 162B may be connected to a second power bus 160B and a second data bus 144B. When the first and second bodies 100A and 100B are connected to each other, the first and second terminals 162A and 162B may be connected to each other. Also, the first power bus 160A and the first data bus 144A are connected to the second power bus 160B and the second data bus 144B, respectively. To charge the battery in the power supply unit 130, exchange data and/or the like, the first body 100A may be disconnected from the second body 100B and connected to the pack or the like, which may, in turn, connect the first terminal 162A to the cigarette connector 216 of the pack or the like. Alternatively, a separate terminal (not shown) may be provided to the eCig 100 for charging and/or wired communications with an external device.

The eCig 100 may further include one or more user interface devices, such as, e.g., an LED unit 134, a sound generator (not shown), a vibrating motor (not shown), and/or the like. The LED unit 134 may be connected to the power supply unit 130 via the power bus 160A and the data bus 144A, respectively. The LED unit 134 may provide a visual indication when the eCig 100 is operating. Additionally, when there is an issue and/or problem within the eCig 100, the integrated sensor/controller circuit 132 may control the LED unit 134 to generate a different visual indication. For example, when the container 140 is almost empty or the battery charge level is low, the LED unit 134 may blink in a certain pattern (e.g., blinking with longer intervals for thirty seconds). When the heater 146 is malfunctioning, the heater 146 may be disabled and control the LED unit 134 may blink in a different pattern (e.g., blinking with shorter intervals for one minute). Other user interface devices may be used to show a text, image, and/or the like, and/or generate a sound, a vibration, and/or the like.

Figure 1B:
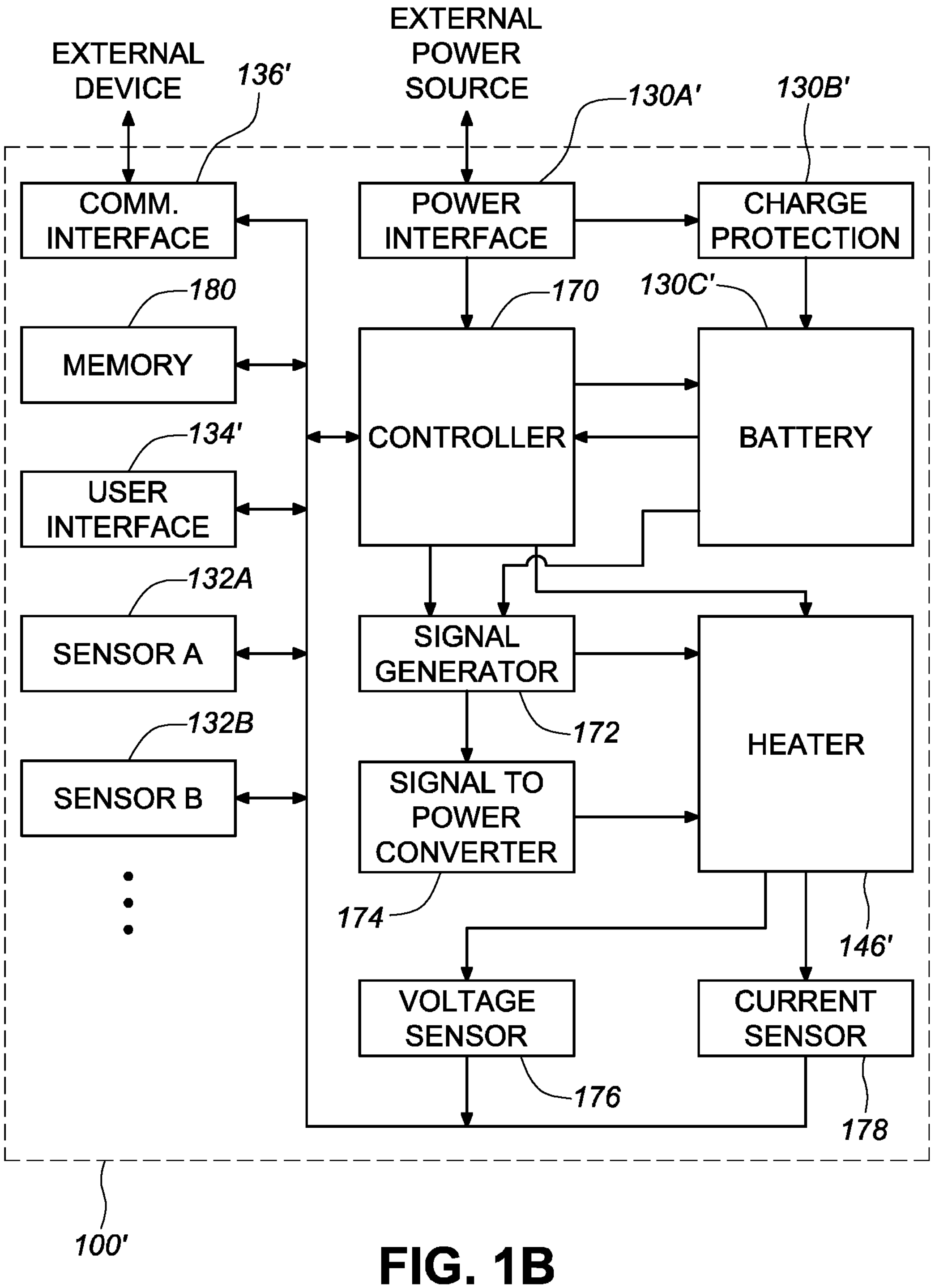
FIG. 1B depicts a schematic overview of another aspect of the electronic smoking device constructed according to the principles of the disclosure.

In the eCig 100 shown in FIG. 1A, the sensor 132 alone may not be able to control the user interface devices, the communication unit 136, the sensors 132 and 148 and/or the like. Furthermore, it may not be possible to carry out more complex and sophisticated operations with the sensor 132 alone. Thus, as noted above, a controller, such as, e.g., microcontroller, microprocessor, a custom analog circuit, an application-specific integrated circuit (ASIC), a programmable logic device (PLD) (e.g., field programmable gate array (FPGA) and the like) and/or the like and basic digital and analog circuit equivalents thereof, may be included the eCig 100. For example, FIG. 1B shows a structural overview of another eCig 100' constructed according to the principles of the disclosure. The eCig 100' may include a controller 170, a signal generator 172, a signal to power converter 174, a voltage sensor 176, a current sensor 178, a memory 180, and/or the like. Further, the eCig 100' may include a power interface 130A', a charge/discharge protection circuit 130B', a battery 130C', one or more sensors (e.g., sensor 132A, sensor 132B and/or the like), a user interface 134', a communication interface 136', a heater 146' and/or the like, which may be similar to the components of the eCig 100 shown in FIG. 1A. Two or more components may be integrated as a single chip, a logic module, a PCB, or the like, to reduce size and manufacturing costs and simplify the manufacturing process. For example, the controller 170 and a sensor 132A may be integrated as a single semiconductor chip.

The controller 170 may perform various operations, such as, e.g., heater calibration, heating parameter adjustment/control, dosage control, data processing, wired/wireless communications, more comprehensive user interaction, and/or the like. The memory 180 may store instructions executed by the controller 170 to operate the eCig 100' and carry out various basic and advanced operations. Further, the memory 180 may store data collected by the controller 170, such as, e.g., usage data, reference data, diagnostics data, error data, and/or the like. The charge/discharge protection circuit 130B' may be provided to protect the battery 130C' from being overcharged, overly discharged, damaged by an excessive power and/or the like. Electric power received by the power interface 130A' may be provided to the battery 130C' via the charge/discharge protection circuit 130B'. Alternatively, the controller 170 may perform the charge/discharge protection operation when the charge/discharge protection circuit 130B' is not available. In this case, the electric power received by the power interface 130A' may be provided to the battery 130C' via the controller 170.

The signal generator 172 may be connected to the controller 170, the battery 130C' and/or the like, and may configured to generate a power control signal, such as, e.g., a current level signal, a voltage level signal, a pulse-width modulation (PWM) duty cycle and the like, to control the power supplied to the heater 146'. Alternatively, the power control signal may be generated by the controller 170. The converter 174 may be connected to the signal generator 172 or the controller 170 to convert the power control signal from the signal generator 172 to an electrical power provided to the heater 146. With this configuration, the power from the battery 130C' may be transferred to the heater 146' via the signal generator 172 or via the signal generator 172 and the converter 174. Alternatively, the power from the battery 130C' may be transferred to the signal generator 172 via the controller 170 and transferred to the heater 146 directly or via the signal to power converter 174.

The voltage sensor 176 and the current sensor 178 may be provided to detect an internal voltage and current of the heater 146', respectively, for heater calibration, heating parameter control and/or the like. For example, each heater 146 may have a slightly different heating temperature, which may be caused by a small deviation in resistance. To produce a more consistent unit-to-unit heating temperature, the integrated sensor/controller circuit 132 may measure a resistance of the heater 146 and adjust heating parameters (e.g., an input current level, heating duration, voltage level, and/or the like) accordingly. This resistance variance can also be measured during manufacturing and stored as a compensation factor in memory. The memory storing the compensation factor can be located in different portions of the eCig. In one embodiment, an eCig with a replaceable cartomizer can store the compensation factor in a memory located within the cartomizer. In another embodiment where the eCig is a disposable eCig, the compensation factor can be stored in a memory of the disposable eCig. Also, the heating temperature of the heater 146 may change while the heater 146 is turned on. The integrated sensor 132/controller 170 circuit may monitor a change in resistance while the heater 146 is turned on and adjust the current level in a real-time basis to maintain the heating temperature at substantially the same level. Further, the integrated sensor 132/controller circuit 170 may monitor whether or not the heater 146 is overheating and/or malfunctioning, and disable the heater 146 for safety purposes when the heating temperature is higher than a predetermined temperature range and/or the heater 146 or other component is malfunctioning.

In some embodiments of the disclosure a predictive algorithm can be used to predict usage aspects of an eCig. The predictive algorithm can take in to account data that has been logged by the system, data tables that are stored in a memory in the eCig, and sensor information. In one embodiment the eCig can use data that has been stored by the device. By utilizing data that has been logged by the system the eCig can attempt to predict future usage patterns of the eCig. The usage patterns that can be predicted include the volume of air drawn through the eCig by a user, the length of a puff by the user, the amount of time between puffs by a user, and other variables. The eCig can also attempt to predict multiple variables at once and base the heating of the eCig off of these predictions. The prediction can be used to ensure the heater is at a proper temperature during use by relying on historical data from a user. In another embodiment, an eCig can use data tables that are stored in a memory in the eCig to attempt to predict future usage patterns. The information listed in the data table can be taken from information on the above listed variables from data collected and averaged to make an "average user," or information that has been specifically supplied by the user to a website, cell phone application, pack interface, eCig interface, or other method. In another embodiment, an eCig can use various sensors that are present within the eCig to predict future use and control the eCig heater accordingly. In a yet further embodiment, an eCig comprises a MEMS gyroscope or other motion sensing device that detects when a user is moving the eCig such that it is likely the user will shortly use the device. This data can sense a motion of where the eCig is being removed from a pack, or being taken from a resting place to a user's mouth. The above predictive algorithms can further be used to turn the eCig off after detecting activation.

In another embodiment of the disclosure various parameters of a heater in an eCig can be controlled. The heater can be controlled by various means, including using a closed loop system and/or an open loop system. In yet another embodiment of the disclosure, a boost converter can be included with the heater control system. The boost converter can be used to boost the voltage that is received from a battery of the eCig or to equalize the voltage that comes from the battery and is sent to the heater. A boost converter can be included in both the closed loop and the open loop systems.

Figure 3:
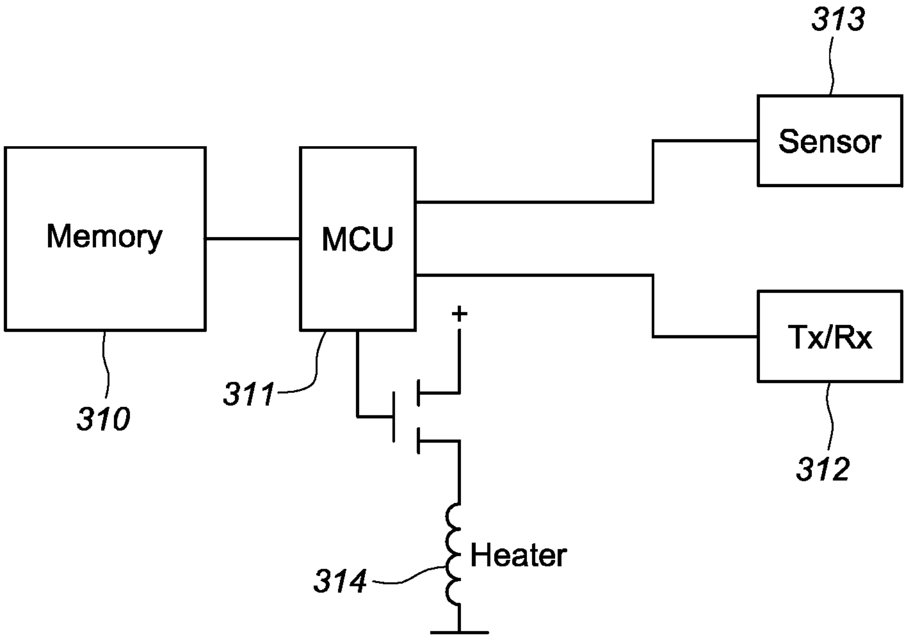
FIG. 3 is a diagram of an exemplary closed loop heater control system.
Figure 6:
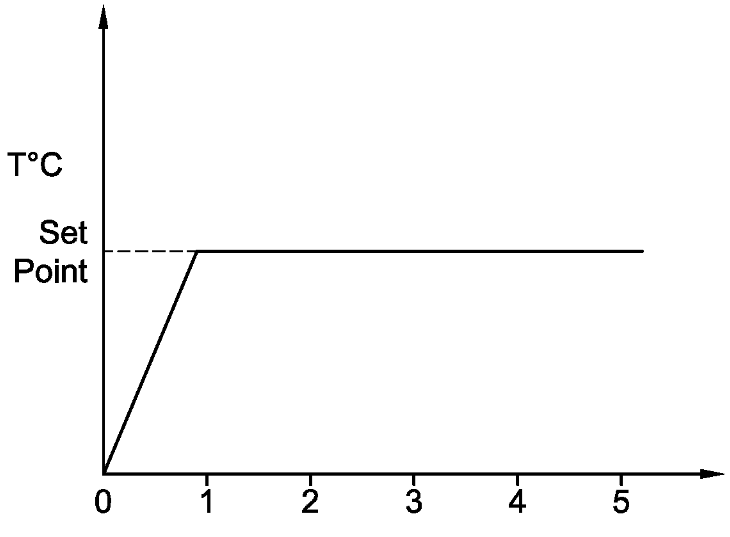
FIG. 6 depicts a graph of a temperature response of a heater over time in a closed loop system.

FIG. 3 illustrates a closed loop system of controlling a heater 314 in an eCig. A closed loop system for controlling the heater 314 in an eCig can comprise a memory 310, an MCU 311, a heater 314, a sensor 313, and a transmitter and/or receiver 312. In the illustrated embodiment the memory 310 can store programming, data logs, or other information that can be used by the MCU 311 to control the heater 314. The MCU 311 can receive signals from the sensor 313 and can also transmit information to the transmitter and/or receiver 312. The transmitter and/or receiver 312 can include Bluetooth, WiFi, CDMA, LTE, ZigBee, and other methods to transmit and receive information. In response to signals received by the MCU 311, the MCU 311 can turn the heater 314 on and off. Various types of sensors can be used by the MCU 311 in the illustrated system to control the heater 314. Some of the sensors that can be used include: a current sensor, a thermistor, a thermocouple, and a resistance temperature detector among others. The sensor 313 can be used along with the memory 310 by the MCU 311 to maintain the heater 314 at a temperature that is ideal for the eCig. In some embodiments the ideal temperature can vary based on the type of juice that is being heated. The ideal temperature for some juices can be 200° C., however, other juices can have higher or lower ideal temperatures. It is also possible that a particular juice will have a range of temperatures that are ideal and the heater 314 can be controlled so that the temperature stays within the desired range. In various embodiments, the juice can comprise a liquid solution, a powder, a solid, a gel, or other media designed to deliver a flavor, nicotine, or other desired output to a user. In some embodiments, the juice can contain a nicotine containing media. The eCig can be configured such that the MCU 311 is able to determine the type of juice being used. They type of juice being used can be transmitted to the MCU 311 by the transmitter and/or receiver 312 or through other processes. The type of juice being used can also be determined by the response of the heater, as sensed by the sensor 313, to a heating cycle as performed by the MCU 311. After determining the type of juice being used in the eCig the MCU 311 can use the memory 310 to determine ideal values for temperature and other controllable variables. The MCU 311 can control the temperature of the heater 314 by using various methods including, pulse width modulation, pulse amplitude modulation, and cycle length. One embodiment of a heating profile of a heater 314 controlled by an MCU 311 in a closed loop system is depicted in FIG. 6.

The MCU 311 can also control the heating of different types of heaters 314 that can be present in the eCig. In eCigs with replaceable cartomizers different heaters 314 can be used depending on the juice included within the cartomizer. In some embodiments the heater 314 can be a porous heater and in other embodiments the heater 314 can be a ceramic heater. Using the MCU 311 to control the output to the different types of heaters can be important as the various heaters can be driven through different methods.

Figure 4:
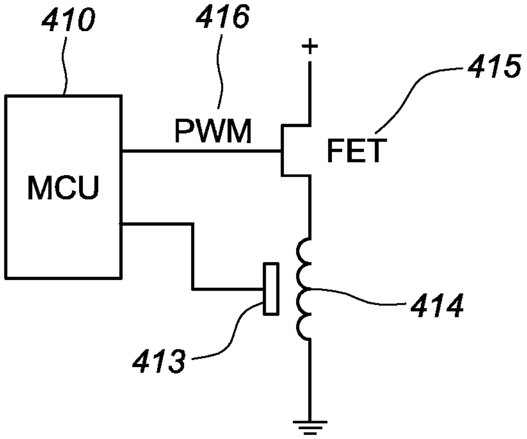
FIG. 4 depicts a diagram of an exemplary heater control system utilizing pulse width modulation.

FIG. 4 illustrates an embodiment of a heater control system according to the disclosure. The heater control system described herein can in some embodiments be an open loop system and in other embodiments can comprise a closed loop system. In a closed loop system, the MCU 410 can be electrically coupled to a sensor 413, a heater 414, and a field effect transistor 415. The sensor 413 can be thermally coupled to the heater 414 such that changes in the temperature of the heater 414 can be sensed the sensor 413. The sensor 413 can comprise a thermistor, an optical thermal sensor, a thermocouple, and/or a resistance temperature detector. The sensor 413 can send temperature or other signals to the MCU 410 so that a temperature of the heater 414 can be within an optimal range. The field effect transistor 415 can source the current to the heater 414 and can be controlled by the pulse width modulation 416 via the MCU 410. Pulse width modulation 416 can be used by the MCU 410 to control the temperature of the heater 414. In some embodiments the pulse width modulation may be provided by a single microprocessor that may be driving the heater 414.

Figure 5:
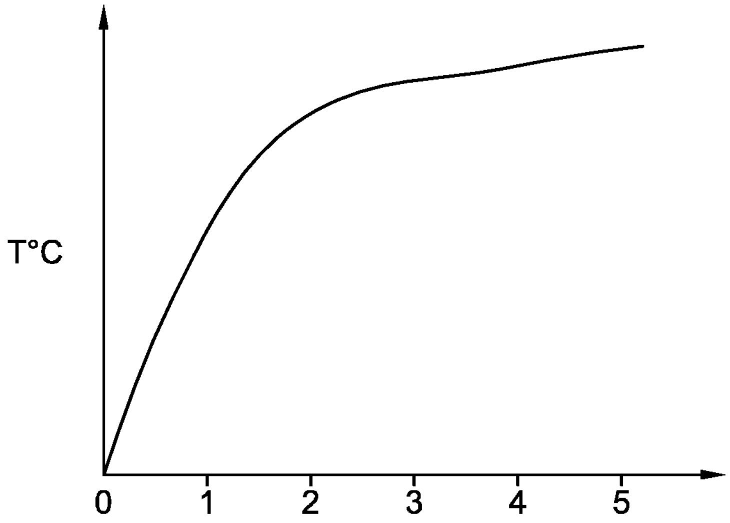
FIG. 5 depicts a graph of the temperature response of a heater over time in an open loop system.

In one embodiment, the MCU 410 can switch between on and off. In other embodiments, both the width and the period of the pulse can be controlled by the MCU 410. The widths and periods of the pulses that will be used by the MCU 410 can vary based on the heater profile that is present in the eCig. The profile that can be utilized for one type of heater can vary significantly from the profile that can be utilized for other heater types. Alternatively, the MCU 410 can change the voltage or current delivered to the heater 414 to control the temperature of the heater 414. In one embodiment, the heater control system can measure current via the resistance of the heater, the system in this embodiment can measure the current of the heater at a high resolution. As the heater temperature increases, the resistance of the coil can increase slightly. For example, in one embodiment, the resistance of the heater can increase between 1-5%. As the resistance of the heater increases the current that is sourced to the heater can decrease and a lower voltage drop can occur across the FET. This embodiment can measure the voltage drop across the FET or the current that distributed to the heater and can use that information to estimate the heater temperature. In another embodiment, the system can measure a voltage change across the FET or the current that distributed to the heater and can use that information to estimate the heater temperature. One example of a heating profile of a heater 414 controlled by an MCU 411 in an open loop system is illustrated in FIG. 5.

The open loop heater control system can also operate within a predicted algorithm. The predicted algorithm can take in to account one or multiple variables when the MCU 410 is determining a heating profile to apply during a heating cycle. The predictive algorithm can take into effect ambient temperature, air flow rate where higher modulation can be used for higher air flow rates and lower modulation can be used for lower air flow rates, battery age, battery charge, battery voltage, aging of the eCig, aging of the heating element, number of puffs that have been taken from the eCig, duration of time for puffs taken, age of the cartomizer, the amount of juice that is being released by the eCig, the type of juice that is being released, and the particular heating element in the eCig among others. The MCU 410 can use any one of these variables or can use multiples of these or other variables within the predictive algorithm. The MCU 410 can further use this information to control the heater as well as the eCig. The MCU 410 can be used to detect information that can minimize mold or other unwanted issues. The MCU 410 can use the information listed above to disable and not heat a particular eCig or cartomizer after a defined length of time in between puffs. One example of this can be the MCU 410 not powering a heater in a cartomizer if the first puff was taken over one month prior. Another example of this can be not powering the heater in a cartomizer if over a month of time has passed since the last puff was taken on the cartomizer. Yet another example can occur when the cartomizer or eCig has an expiration date that occurs at a set length of time after the eCig or cartomizer has been manufactured.

Figure 7:
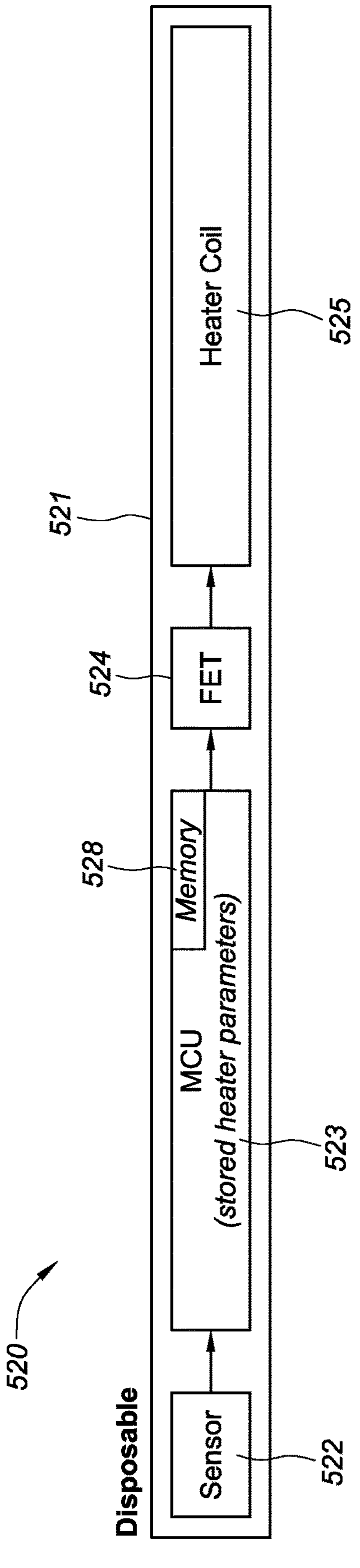
FIG. 7 is a diagram of an embodiment of electronic cigarette according to the disclosure.

FIG. 7 depicts an embodiment of an electronic cigarette 520 according to the disclosure. The electronic cigarette 520 depicted in FIG. 7 can comprise a disposable electronic cigarette 520 that can comprise a housing 521, a sensor 522, an MCU 523, an FET 524, and a heater coil 525. The MCU 523 can further comprise a memory 528. The memory 528 may store instructions executed by the MCU 523 to operate the electronic cigarette 520 and carry out various basic and advanced operations. Further, the memory 528 may store data collected by the MCU 523 such as, e.g., usage data, reference data, diagnostics data, error data, and/or the like. The electronic cigarette 520 can further comprise a vaporization substance (not shown).

Figure 8:
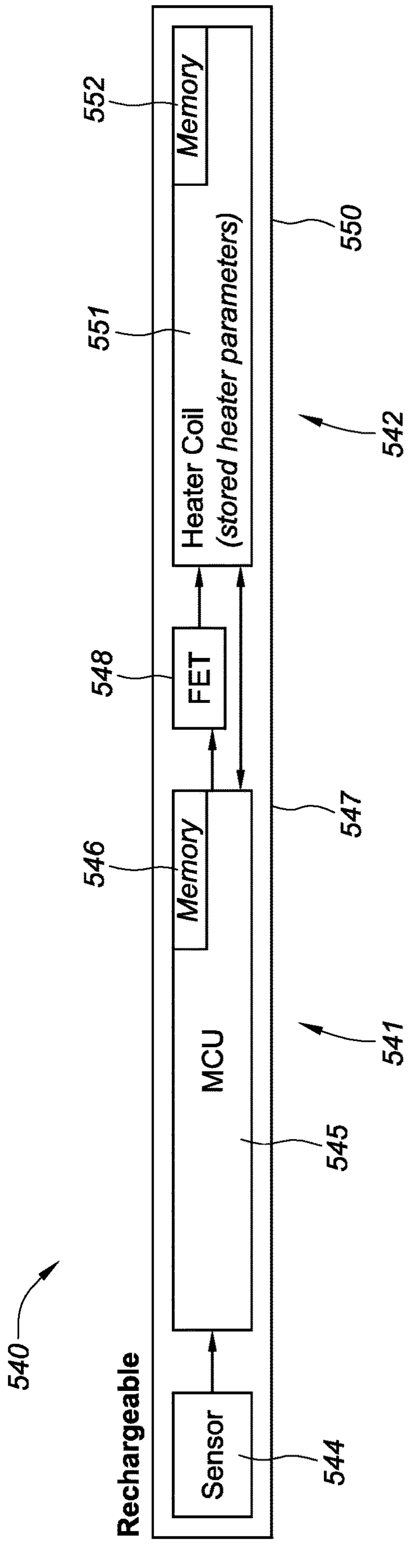
FIG. 8 is a diagram of another embodiment of an electronic cigarette according to the disclosure.

FIG. 8 depicts another embodiment of an electronic cigarette 540 according to the disclosure. The electronic cigarette 540 depicted in FIG. 8 can comprise a battery portion 541 and a cartomizer portion 542. The battery portion 541 can comprise a first housing 547, a sensor 544, an MCU 545, a first memory 546, and an FET 548. The cartomizer portion 542 can comprise a second housing 550, a heater coil 551, and a second memory 552. The battery portion 541 and the cartomizer portion 542 can be configured to fit together through screw threads, a friction fit, or other mechanism that would be known to one skilled in the art. The battery portion 541 can be further configured to house a battery (not shown) that in some embodiments can be rechargeable. The cartomizer portion 542 can further comprise a vaporization substance (not shown).

Figure 9:
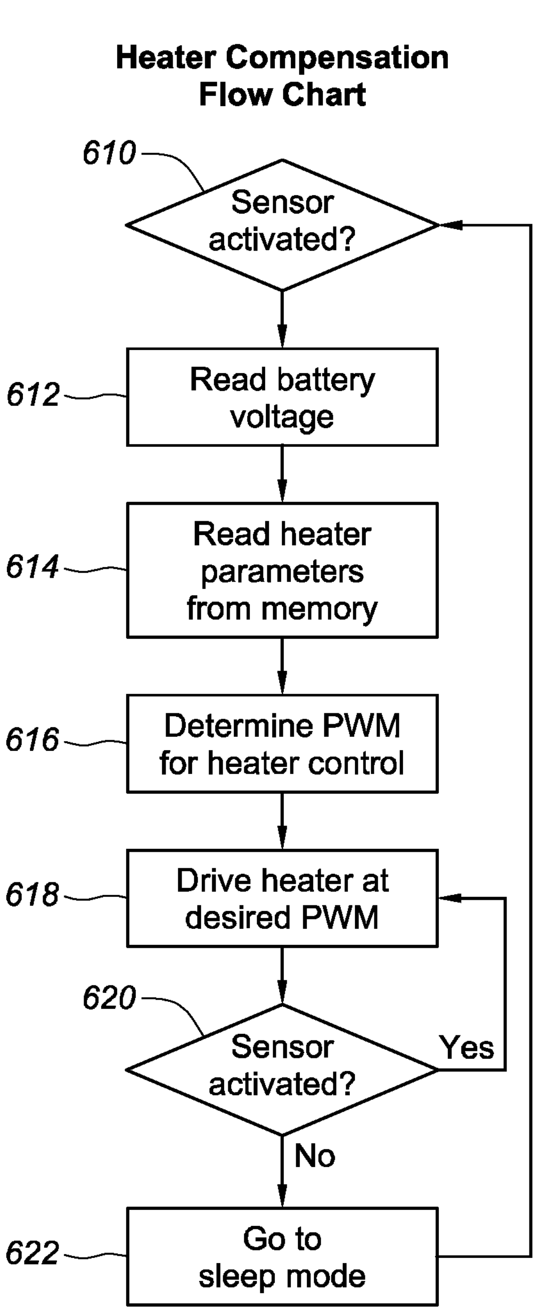
FIG. 9 is a flow-chart depicting a method of heater compensation.

FIG. 9 illustrates a flowchart showing a method for heater compensation used by one embodiment of the disclosure. The method comprises the following steps:

At step 610, a controller detects whether the sensor is activated;

At step 612, if the controller detects that the sensor is activated the controller reads the battery voltage;

At step 614, the controller reads the memory for the heater parameters;

At step 616, the controller determines the pulse width modulation for the heater control based off the battery voltage and the heater parameters;

At step 618, the controller drives the heater at with the desired pulse width modulation;

At step 620, the controller detects whether the sensor is activated; if the sensor is activated the controller goes to step 618 and again drives the heater at the desired pulse width modulation, if the sensor is not activated the controller goes to step 622 and goes to sleep mode;

At step 622 the controller goes to sleep mode and the method goes back to step 610.

Figure 10:
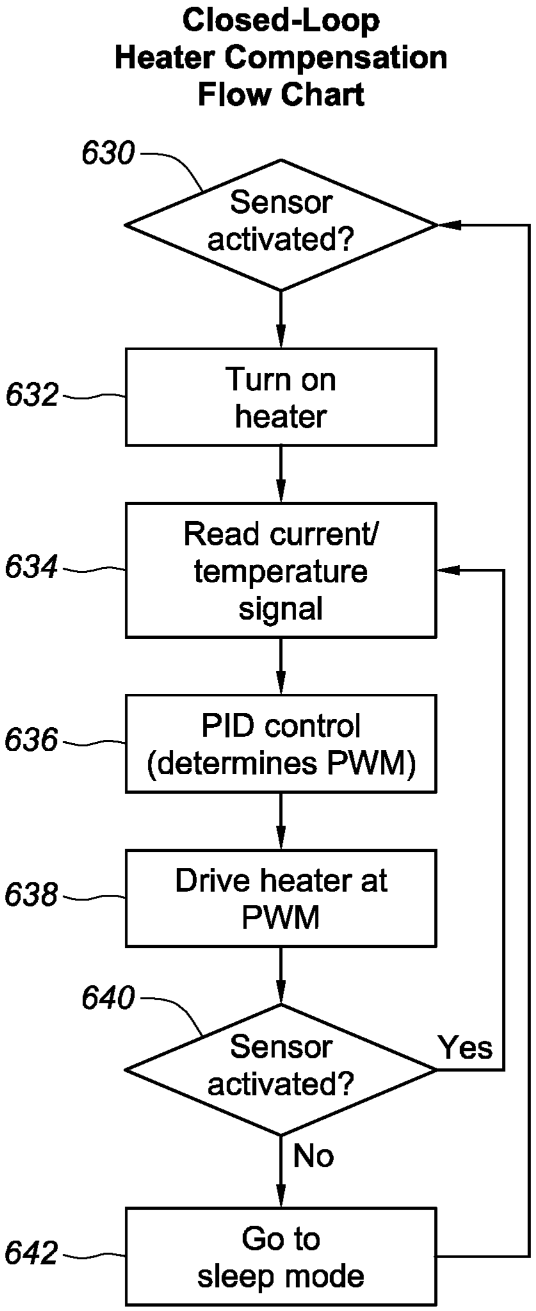
FIG. 10 is a flow-chart depicting a method of closed-loop heater compensation.

FIG. 10 illustrates a flowchart showing a method of closed-loop heater compensation used by one embodiment of the disclosure. The method comprises the following steps:

At step 630, a controller detects whether the sensor is activated;

At step 632, the controller turns on the heater;

At step 634, the controller reads the current or temperature signal sent to the controller;

At step 636, the controller communicates with a PID control and determines the pulse width modulation for the heater;

At step 638, the controller drives the heater at the desired pulse width modulation;

At step 640, the controller detects whether the sensor is activated; If the sensor is activated the method returns to step 634 to read the current or temperature signal; If the sensor is not activated the method continues to step 642;

At step 642, the controller goes to sleep mode and the method goes back to step 630.

Figure 11A:
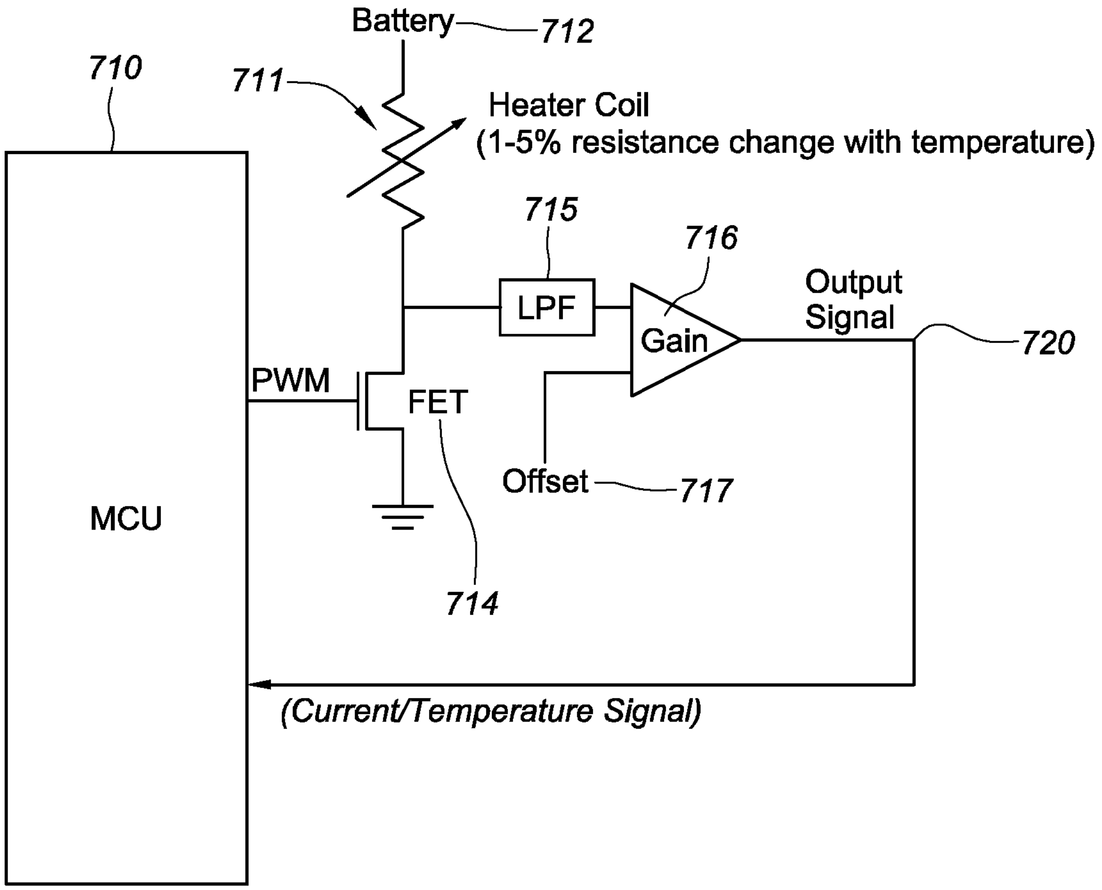
FIGS. 11A and 11B are embodiments of an electrical diagram of a circuit that can measure the resistance change without a current sense resistor.

FIG. 11A depicts an embodiment of a diagram of an electrical circuit configured to measure the resistance change of an electronic cigarette without a current sense resistor. The electrical circuit can comprise an MCU 710, an FET 714, a heater coil 711, a battery 712, a low-pass filter 715, a gain 716, an offset 717, and an output signal 720.

Figure 11B:
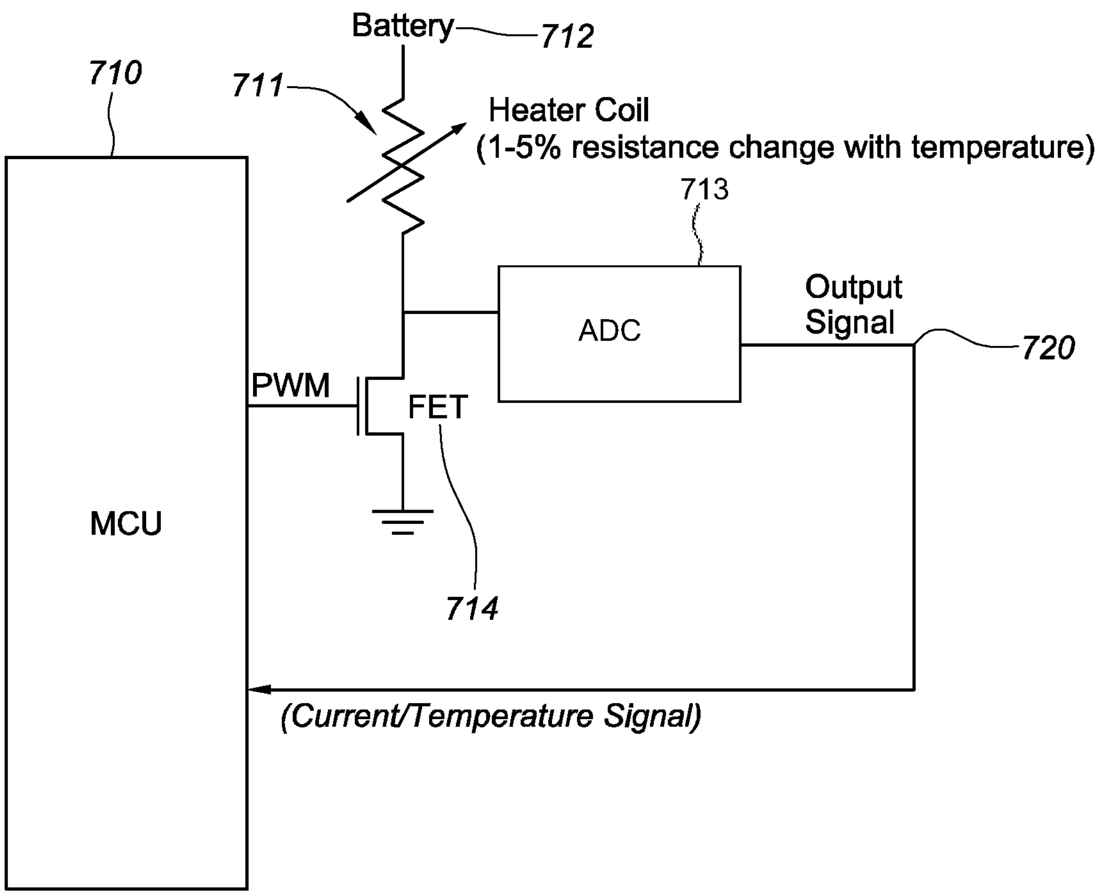

FIG. 11B depicts an embodiment of a diagram of an electrical circuit configured to measure the resistance change of an electronic cigarette without a current sense resistor. The electrical circuit can comprise an MCU 710, an FET 714, a heater coil 711, a battery 712, a hi-resolution ADC 713, and an output signal 720. In one embodiment, the hi-resolution ADC can only sense when the FET 714 is on. By using a hi-resolution ADC, a low-pass filter, a gain, and an offset are not required. In another embodiment, the electrical circuit can further comprise a Wheatstone bridge. The Wheatstone bridge can allow the circuit to sense a temperature of the heater coil when the coil is not in use.

Figure 12A:
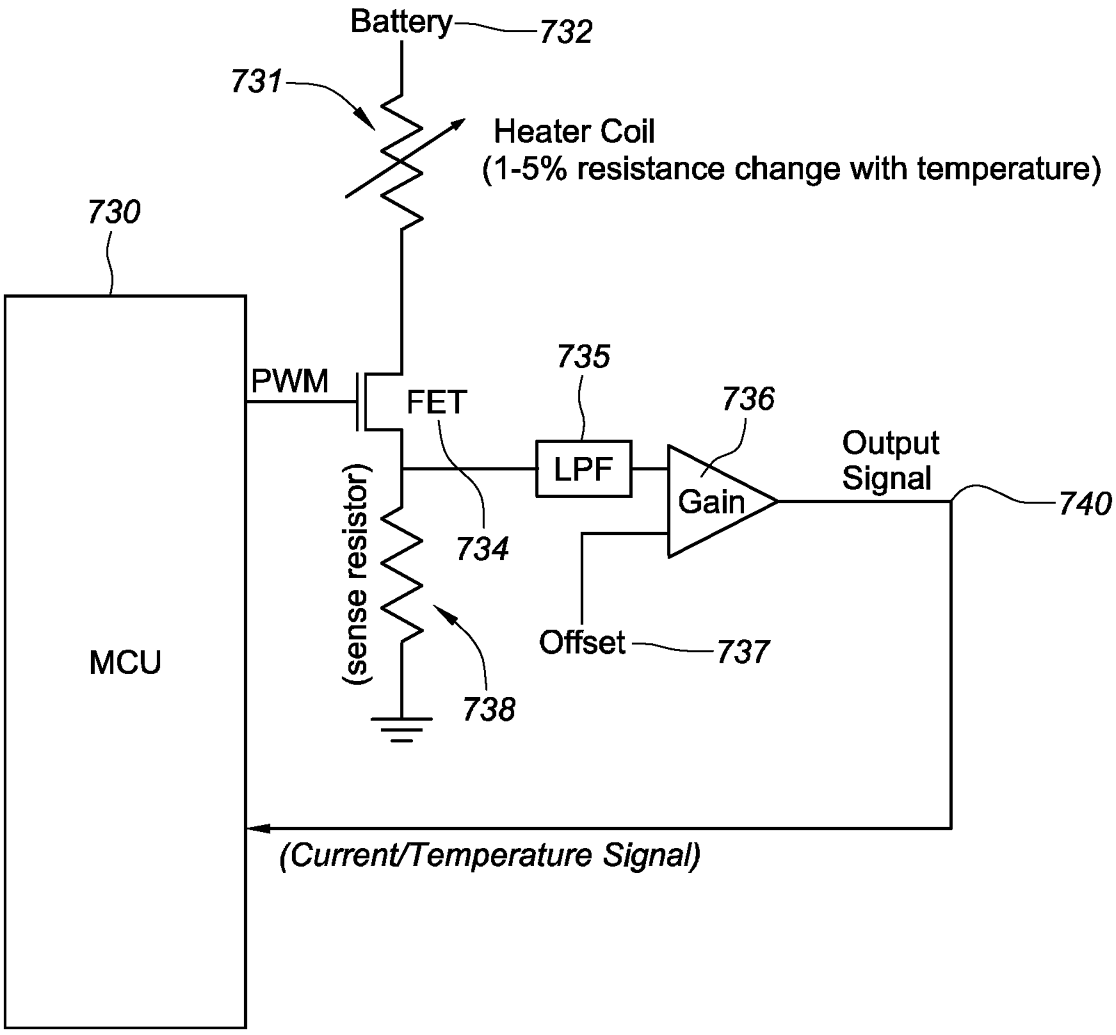
FIGS. 12A and 12B are embodiments of an electrical diagram of a circuit that can measure the resistance change with a current sense resistor.

FIG. 12A depicts a diagram of an electrical circuit configured to measure the resistance change of an electronic cigarette with a current sense resistor. The electrical circuit can comprise an MCU 730, an FET 734, a heater coil 731, a battery 732, a sense resistor 738 a low-pass filter 735, a gain 736, an offset 737, and an output signal 740.

Figure 12B:
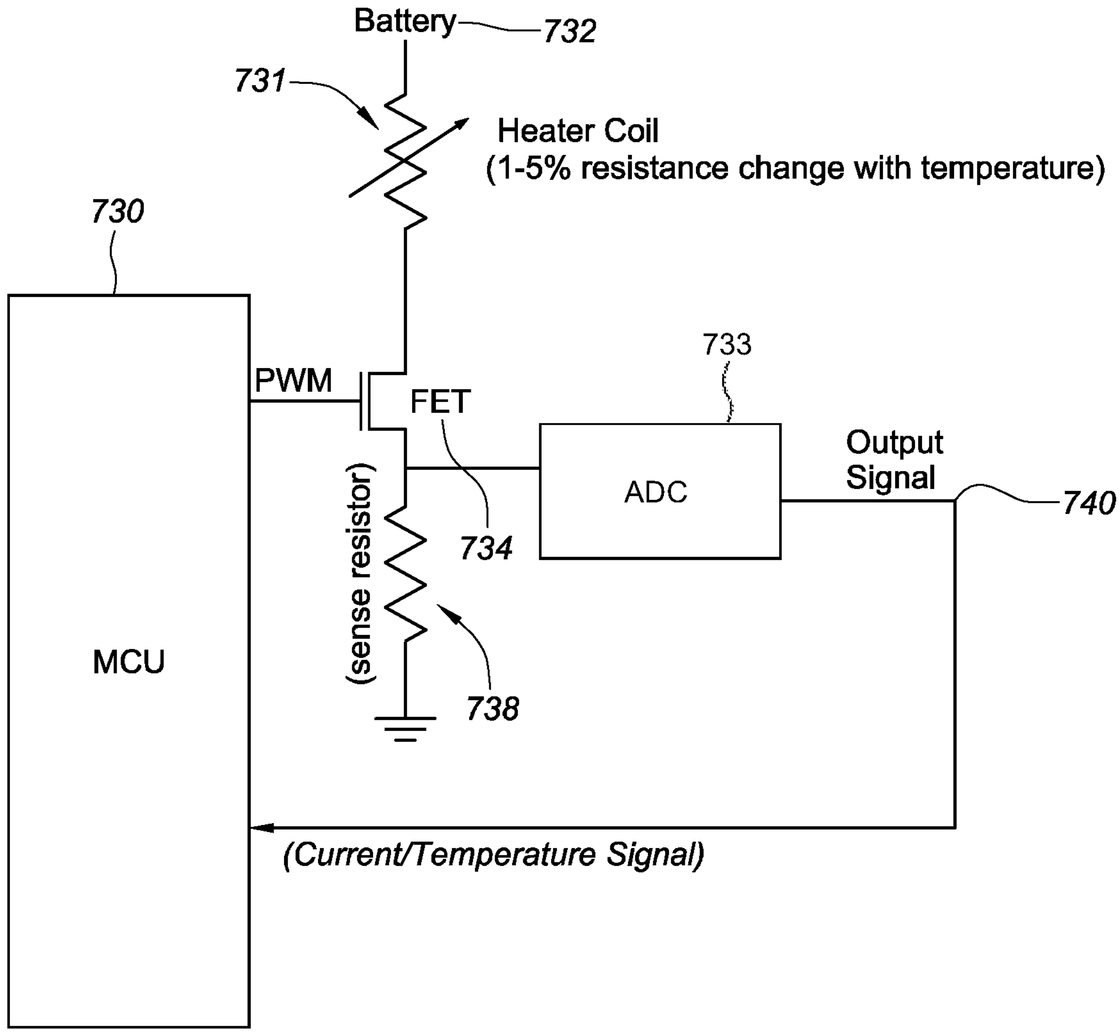

FIG. 12B depicts a diagram of an electrical circuit configured to measure the resistance change of an electronic cigarette with a current sense resistor. The electrical circuit can comprise an MCU 730, an FET 734, a heater coil 731, a battery 732, a sense resistor 738, a hi-resolution ADC 733, and an output signal 740. In one embodiment, the hi-resolution ADC can only sense when the FET 714 is on. By using a hi-resolution ADC, a low-pass filter, a gain, and an offset are not required. In another embodiment, the electrical circuit can further comprise a Wheatstone bridge. The Wheatstone bridge can allow the circuit to sense a temperature of the heater coil when the coil is not in use.

Figure 13:
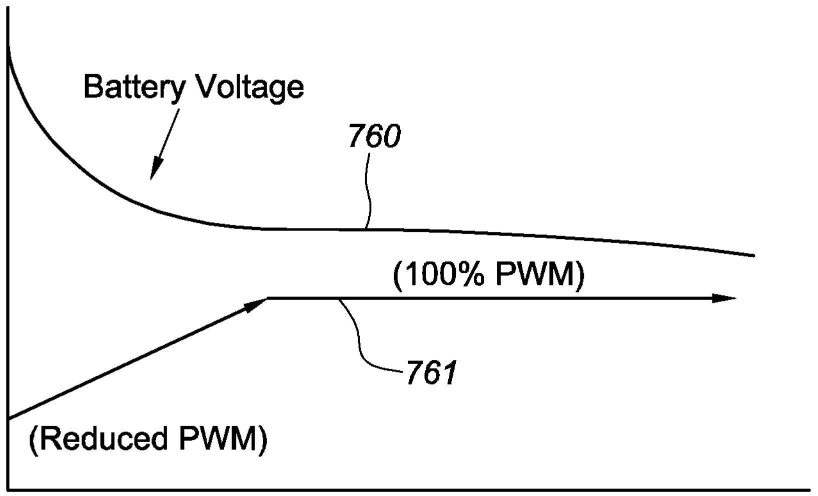
FIG. 13 is a graph illustrating the pulse width modulation that can occur for different battery voltages over time.

FIG. 13 is a graph depicting the pulse width modulation that can occur for varying strengths of the battery voltage. The pulse width modulation 761 is reduced at times when the battery voltage 760 of the battery is higher. As the battery voltage 760 is reduced the controller can increase the pulse width modulation 761. By controlling the pulse width modulation 761, the controller can keep an increased control over the output of the temperature of a heater or other atomization mechanism of an electronic cigarette.

Figure 14:
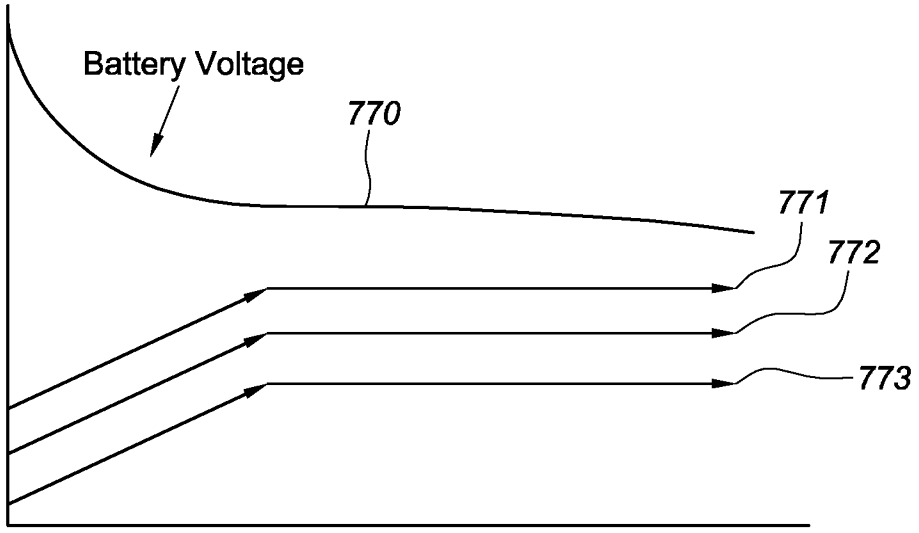
FIG. 14 is a graph illustrating the varying pulse width modulation that can occur for different battery voltages over time and heater parameters.

FIG. 14 is a graph depicting the pulse width modulation that can occur for varying strengths of battery voltage and heater parameters. The controller can utilize a first pulse width modulation 771, a second pulse width modulation 772, and a third pulse width modulation 773. In one embodiment the controller can utilize any number of stored pulse width modulation schemes that are stored within a memory that can be accessed by the controller. In yet other embodiments, the controller can store the pulse width modulation schemes in the controller itself. The controller can read the battery voltage 770 and read the heater parameters. The controller can then determine the pulse width modulation that should occur for the battery voltage 770 and heater parameter present. FIG. 14 illustrates three pulse width modulation schedules that increase as the battery voltage 770 drops. Other pulse width modulation schedules can also be used based on the desired performance of the heater or other atomization mechanism.

Figure 15:
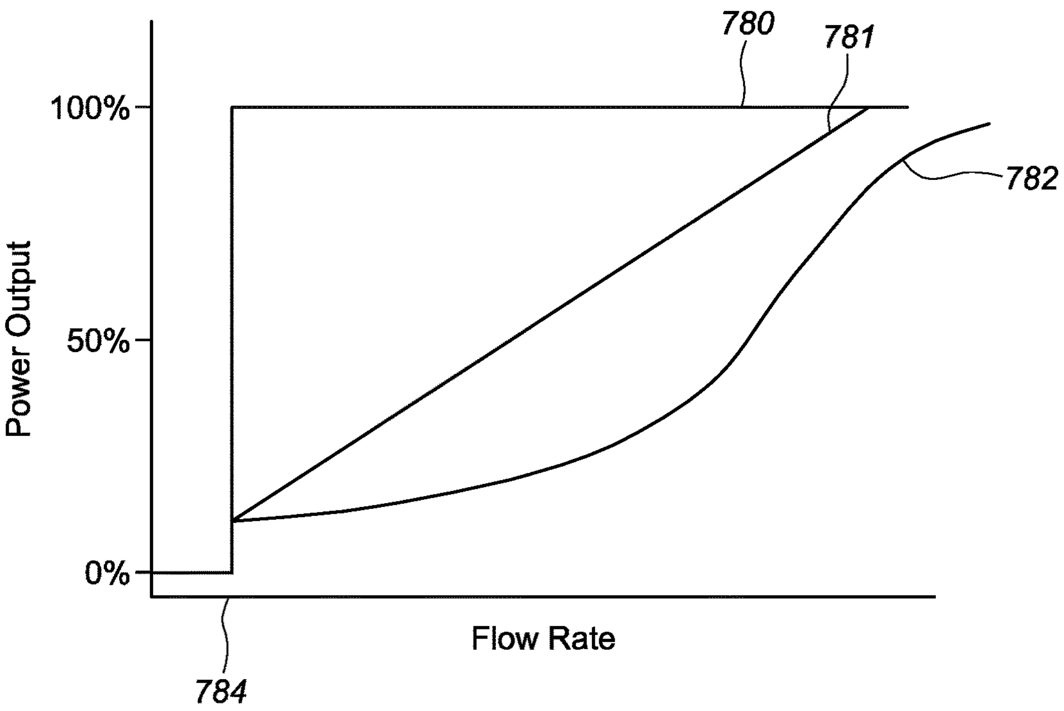
FIG. 15 is a graph illustrating another embodiment of a pulse width modulation.

FIG. 15 is a graph illustrating several versions of power output to a coil for various flow rates of air through the system. The graph includes a first power output 780 that does not comprise a pulse width modulation, a second power output 781 that comprises a linear pulse width modulation, and a third power output 782 that comprises an exponential pulse width modulation. The first power output 780 starts from an initial state of no power output to the coil, until a first threshold 784 is met. The first threshold 780 can comprise various amounts of air flow. In some embodiments, the first threshold can change depending on data received by the system. Once the first threshold 784 is met, the first power output increases the power output to a set number for any flow rate greater than the first threshold 784. The second power output 781 starts from an initial state of no power output to the coil, until a first threshold 784 is met. Once the first threshold 784 is met, the second power output 781 increases in a linear manner as an increase in flow rate is observed by the system. The third power output 782 starts from an initial state of no power output to the coil, until a first threshold 784 is met. Once the first threshold 784 is met, the rate of an increase in power output for a change in flow rate can follow an exponential curve. The exponential curve of the pulse width modulation can comprise many different types of exponential curves depending on the desired characteristics of the system. The various curves illustrated in FIG. 15 show alternative ways of controlling the percentage of maximum power that can be output to a coil for various sensed flowed rates. A system can comprise one or more of these control programs. The amount of power actually output to the coil can vary in all three embodiments shown herein. In another embodiment, the system or electronic cigarette can further comprise a pre-heating portion. In this embodiment, the system can comprise an initial power output when any air flow is sensed or otherwise determined by the system to pre-heat the heater before the threshold is met.

Figure 16:
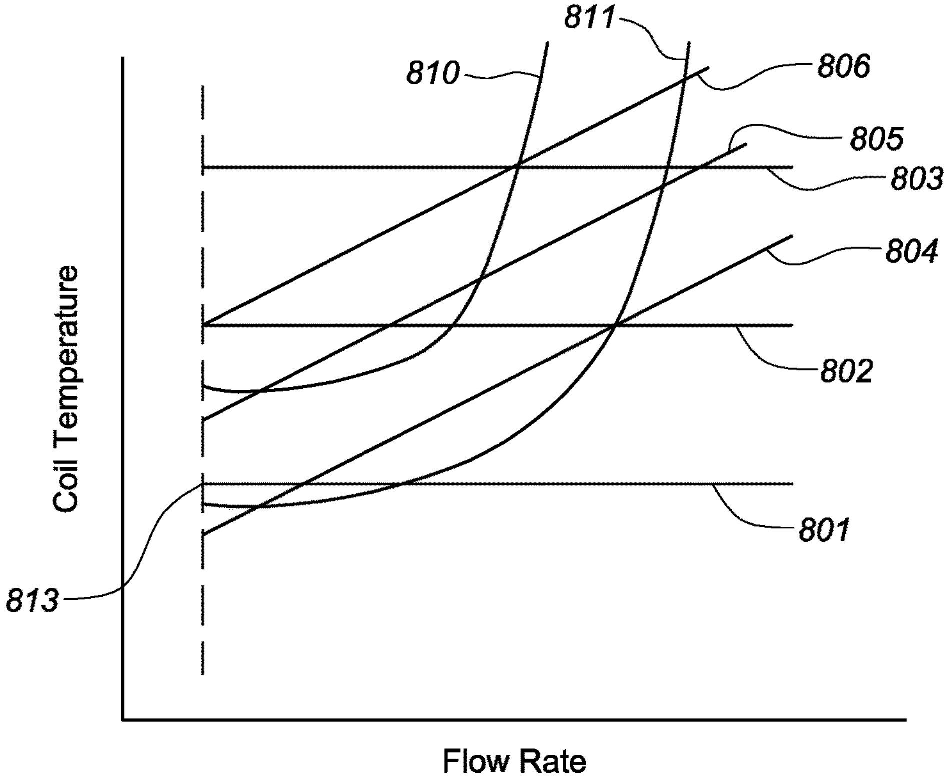
FIG. 16 is a graph illustrating a plurality of embodiments of coil temperature versus air flow rates.

FIG. 16 illustrates a graph showing several embodiments of a system for varying the coil temp of a system for different flow rates. The coil temps can comprise a first flat temp plot 801, a second flat temp plot 802, a third flat temp plot 803, a first ramped temp plot 804, a second ramped temp plot 805, and a third ramped temp plot 806. The graph further illustrates a first non-linear ramped plot 810 and a second non-linear ramped plot 811. The first flat temp plot 801, the second flat temp plot 802, and the third flat temp plot 803 each plot a system comprising keeping a constant temperature on a coil during a variety of flow rates of air or other fluid over the coil. As seen previously in FIG. 15, no power is supplied to the coil until a threshold flow rate 813 is determined. After the threshold flow rate 813 is determined, a coil within the system is brought to a pre-determined temperature. As the flow rate increases, each of the first flat temp plot 801, the second flat temp plot 802, and the third flat temp plot 803 are kept at a constant temperature by the system. The first ramped temp plot 804, the second ramped temp plot 805, and the third ramped temp plot 806 each comprise a coil temperature that increases in a linear manner as a flow rate determined by the system increases. Once the threshold flow rate 813 is detected by the system the coil temperature is brought up to an initial pre-determined temperature. As the system detects an increasing flow rate the temperature of the coil is increased in a linear manner. In one embodiment, the slope of each of the ramped temperature plots can vary depending on a pre-programmed plan. In another embodiment, the slope of each of the ramped temperature plots can be chosen by a user. Similarly, the first non-linear ramped plot 810 and the second non-linear ramped plot 811 can both comprise various non-linear plots. In one embodiment, the first non-linear ramped plot 810 and the second non-linear ramped plot 811 can comprise exponential plots that increase in an exponential manner as the flow rate increases. In other embodiments, each non-linear ramped plot can comprise a decrease or an increase in temperature as the flow rate increases. This can allow the coil to get hotter as more air flow flows past the coil. In another embodiment, the system or electronic cigarette can further comprise a pre-heating portion. In this embodiment, the system can comprise an initial power output when any air flow is sensed or otherwise determined by the system to pre-heat the heater before the threshold is met.

In another embodiment, the electronic smoking device or system can track how a user draws from the electronic smoking device and can learn a draw style of a user and choose a preferred temperature curve. The system can track multiple types of information including, length of puffs, amount of air flow over the coil, changes in air flow throughout the length of a puff, and other information as would be known to one of skill in the art. A coil temperature curve can then be determined from this data. In another embodiment, the system can comprise a maximum temperature for the coil. In one embodiment, the maximum temperature can be set at a value that is below the level of damaging or destroying any nicotine present within the electronic smoking device. The maximum temperature can be set during the manufacturing process or can be communicated to the system when a replaceable cartomizer or other device is attached thereto. Different cartomizers can comprise different maximum temperatures. In other embodiments, the coil can comprise a first coil, and the system or electronic smoking device can comprise a plurality of coils. Each of the plurality of coils can comprise a control program as described herein. In one embodiment, each coil can comprise a different control program. In another embodiment, the maximum temperature can be used by the system to determine that the heater may not be in contact with the medium to be heated. In this embodiment, the temperature of the heater can be monitored and if the system detects a predetermined temperature profile the system can reduce or stop the heater. In one embodiment, the system can detect a plateau of temperature when the heater is in contact with the medium to be heated. When the heater or wick is dry, the temperature of the heater can spike. In various embodiments, the system or the MCU can determine that a sensed spike in temperature is a sign that the medium is no longer being heated by the heater and reduce an amount of power sent to the heater or turn off the heater.

In another embodiment, the coil temperature illustrated in the y-axis of FIG. 16 can be replaced with other tracked information. In various embodiments, the coil temperature can be replaced with an amount of nicotine delivery, an amount of vapor produced, an amount of flavor delivery, a payload delivery, or other desired variable. In one embodiment, the electronic smoking device can be configured to deliver a consistent amount of nicotine through controlling the amount of power delivered to a coil or a temperature of at least one coil. The consistent amount of nicotine can be delivered through different external factors including level of liquid within the electronic smoking device or the strength of a draw of puff taken by a user. In one embodiment, consistent nicotine delivery can be achieved by using a higher temperature for a user that draws a lower amount of air through the electronic smoking device and using a lower temperature for a user that draws a higher amount of air through the electronic smoking device. In another embodiment, a user that takes a more aggressive pull or that pulls a higher amount of air through the electronic smoking device can cause a higher amount of convective cooling at the coil. In this embodiment, the amount of energy delivered to the coil can be increased to keep the coil at a desired temperature.

In another embodiment, the electronic smoking device can comprise at least two coils. The first coil can be configured to interact with a first liquid and the second coil can be configured to interact with a second liquid. Each of the coils can follow a separate control program as described above. In one embodiment, the first liquid can comprise a nicotine and a first flavor solution and the second liquid can comprise nicotine and a second flavor solution. In another embodiment the first liquid can comprise nicotine and the second liquid can comprise a flavorant. In yet another embodiment, the first liquid can comprise nicotine and a first flavor and the second liquid can comprise a second flavor. The liquids can further comprise an aerosol forming solution.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

A "computer," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, or the like, or an array of processors, microprocessors, central processing units, general purpose computers, super computers, personal computers, laptop computers, palmtop computers, notebook computers, desktop computers, workstation computers, servers, or the like.

A "server," as used in this disclosure, means any combination of software and/or hardware, including at least one application and/or at least one computer to perform services for connected clients as part of a client-server architecture. The at least one server application may include, but is not limited to, for example, an application program that can accept connections to service requests from clients by sending back responses to the clients. The server may be configured to run the at least one application, often under heavy workloads, unattended, for extended periods of time with minimal human direction. The server may include a plurality of computers configured, with the at least one application being divided among the computers depending upon the workload. For example, under light loading, the at least one application can run on a single computer. However, under heavy loading, multiple computers may be required to run the at least one application. The server, or any if its computers, may also be used as a workstation.

A "network." as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, the Internet, or the like, or any combination of the foregoing, any of which may be configured to communicate data via a wireless and/or a wired communication medium. These networks may run a variety of protocols not limited to TCP/IP, IRC or HTTP.

A "computer-readable medium," as used in this disclosure, means any medium that participates in providing data (for example, instructions) which may be read by a computer. Such a medium may take many forms, including non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium may include a "Cloud," which includes a distribution of files across multiple (e.g., thousands of) memory caches on multiple (e.g., thousands of) computers.

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G or 4G cellular standards, Bluetooth, or the like.

The terms "including," "comprising" and variations thereof, as used in this disclosure, mean "including, but not limited to," unless expressly specified otherwise.

The terms "a," "an," and "the," as used in this disclosure, means "one or more," unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

What is claimed:

1. A system for controlling a heater comprising:
a power source;
a memory configured to store programing;
a microcontroller unit (MCU);
a transmitter;
a solution;
a heater configured to heat the solution; and
a sensor operatively coupled to the heater;
wherein the power source, the memory, the MCU, the heater, the sensor, and the transmitter are electrically coupled, wherein the MCU can receive signals from the sensor, control the heater, and communicate with the transmitter, and wherein the MCU is configured to use programming stored in the memory to control the heater,
wherein the sensor comprises a field effect transistor, a gain, a low-pass filter, and an offset, and
wherein the MCU performs a heating cycle at the heater and determines a type of solution being heated by the heater by measuring a resistance change using the sensor.

2. The system according to claim 1, wherein the heater is a first heater and the system further comprises a second heater electrically coupled to the MCU.

3. The system according to claim 1, wherein the MCU is further configured to determine ideal values for a temperature of the heater for the determined type of solution.

4. The system according to claim 1, wherein the MCU is configured to control a temperature of the heater by pulse width modulation or cycle length.

5. The system according to claim 1, wherein the field effect transistor is configured to source a current to the heater and wherein the MCU is configured to control the field effect transistor by pulse width modulation.

6. The system according to claim 1, wherein the MCU is configured to determine a temperature of the heater by measuring a voltage.

7. The system according to claim 6, wherein the voltage is measured across the field effect transistor.

8. The system according to claim 1, wherein the MCU is configured to operate within a predicted algorithm.

9. The system according to claim 8, wherein the predicted algorithm is configured to determine a type of the heater and to utilize the type within the predicted algorithm.

10. The system according to claim 1, wherein the MCU is configured to control an amount of power delivered to the heater through a pulse width modulation.

11. The system according to claim 10, wherein the pulse width modulation is configured to vary depending on a detected voltage of the power source.

12. The system according to claim 11, wherein the pulse width modulation is configured to be reduced when the battery voltage is higher and is configured to be higher when the battery voltage is lower.

13. The system according to claim 10, wherein the pulse width modulation is configured to keep the heater at a constant temperature as a flow rate of air.

14. The system according to claim 10, wherein the pulse width modulation is configured to increase a temperature of the heater in a linear manner as a flow rate of air increases.

15. The system according to claim 10, wherein the pulse width modulation is configured to increase a temperature of the heater in a exponential manner as a flow rate of air over the heater increases.

16. A system for controlling a heater comprising:
- a power source;
- a memory configured to store programing;
- a microcontroller unit (MCU);
- a transmitter;
- a solution;
- a heater configured to heat the solution; and
- a sensor operatively coupled to the heater;
- wherein the power source, the memory, the MCU, the heater, the sensor, and the transmitter are electrically coupled, wherein the MCU can receive signals from the sensor, control the heater, and communicate with the transmitter, and wherein the MCU is configured to use programming stored in the memory to control the heater,
- wherein the sensor comprises a field effect transistor and a hi-resolution Analog-to-Digital Converter (ADC), and
- wherein the MCU performs a heating cycle at the heater and determines a type of solution being heated by the heater by measuring a resistance change using the sensor.

17. The system according to claim 16, wherein the heater is a first heater and the system further comprises a second heater electrically coupled to the MCU.

18. The system according to claim 16, wherein the MCU is configured to control a temperature of the heater by pulse width modulation or cycle length.

19. The system according to claim 16, wherein the MCU is configured to determine a temperature of the heater by measuring a voltage.

20. The system according to claim 16, wherein the MCU is configured to operate within a predicted algorithm.

* * * * *